United States Patent
Ju et al.

(10) Patent No.: US 6,962,364 B2
(45) Date of Patent: Nov. 8, 2005

(54) CURTAIN AIR BAG ASSEMBLY

(75) Inventors: Chang-Hwan Ju, Rochester, MI (US); Shakir M. Salmo, Sterling Heights, MI (US); Kenneth Douglas Moniaci, Royal Oak, MI (US); Jeffrey S. Coon, Sterling Heights, MI (US); Pongdet Paul Wipasuramonton, Rochester, MI (US); Mark Otto Olson, Farmington Hills, MI (US); Kaustubh Bedekar, Auburn Hills, MI (US); Paul Raymond Weber, Birmingham, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 81 days.

(21) Appl. No.: 10/439,580

(22) Filed: May 16, 2003

(65) Prior Publication Data

US 2003/0218324 A1 Nov. 27, 2003

Related U.S. Application Data (60) Provisional application No. 60/382,948, filed on May 24, 2002.

(51) Int. Cl.[7] .................. B60R 21/22; B60R 21/20; B60R 21/16; B60R 21/28; B60R 21/24
(52) U.S. Cl. .................. 280/730.2; 280/729; 280/740; 280/742; 280/743.1
(58) Field of Search .................. 280/730.2, 743.1, 280/729, 740, 742

(56) References Cited

U.S. PATENT DOCUMENTS

| | | | |
|---|---|---|---|
| 6,199,898 B1 * | 3/2001 | Masuda et al. | 280/730.2 |
| 6,464,251 B1 * | 10/2002 | Volkmann et al. | 280/730.2 |
| 6,530,595 B2 * | 3/2003 | Masuda et al. | 280/730.2 |
| 6,554,314 B1 * | 4/2003 | Uchiyama et al. | 280/730.2 |
| 6,755,436 B2 * | 6/2004 | Hess et al. | 280/733.2 |
| 2002/0101066 A1 * | 8/2002 | Tanase et al. | 280/730.2 |

FOREIGN PATENT DOCUMENTS

| | | |
|---|---|---|
| JP | 11 321536 A | 11/1999 |
| WO | WO 03/002488 A2 | 1/2003 |

* cited by examiner

*Primary Examiner*—Paul N. Dickson
*Assistant Examiner*—Joselynn Y. Sliteris
(74) *Attorney, Agent, or Firm*—Lonnie Drayer; Markell Seitzman

(57) ABSTRACT

A side curtain air bag assembly is provided, which has an inlet configured to receive inflation gas, a plurality of inflatable chambers; and a distribution tube in fluid communication with the inlet of the air bag. The inlet and the distribution tube are configured to cause inflation gas to flow along the air bag in a predetermined direction, and the distribution tube has a conical portion configured to reduce the pressure of the inflation gas pressure that is communicated from the inlet, and to distribute the inflation gas to the inflatable compartments of the air bag. The air bag is stored with the distribution tube wrapped about an inboard side of the air bag and in a manner such that the distribution tube unwraps from the air bag and is positioned between the inboard side of the air bag and the adjacent side structure of the vehicle as inflation gas is being initially communicated to the distribution tube, thereby enabling the air bag to deploy without interference with gaps that may exist (or may form) at the adjacent side structure of the vehicle.

6 Claims, 6 Drawing Sheets

Figure 1:
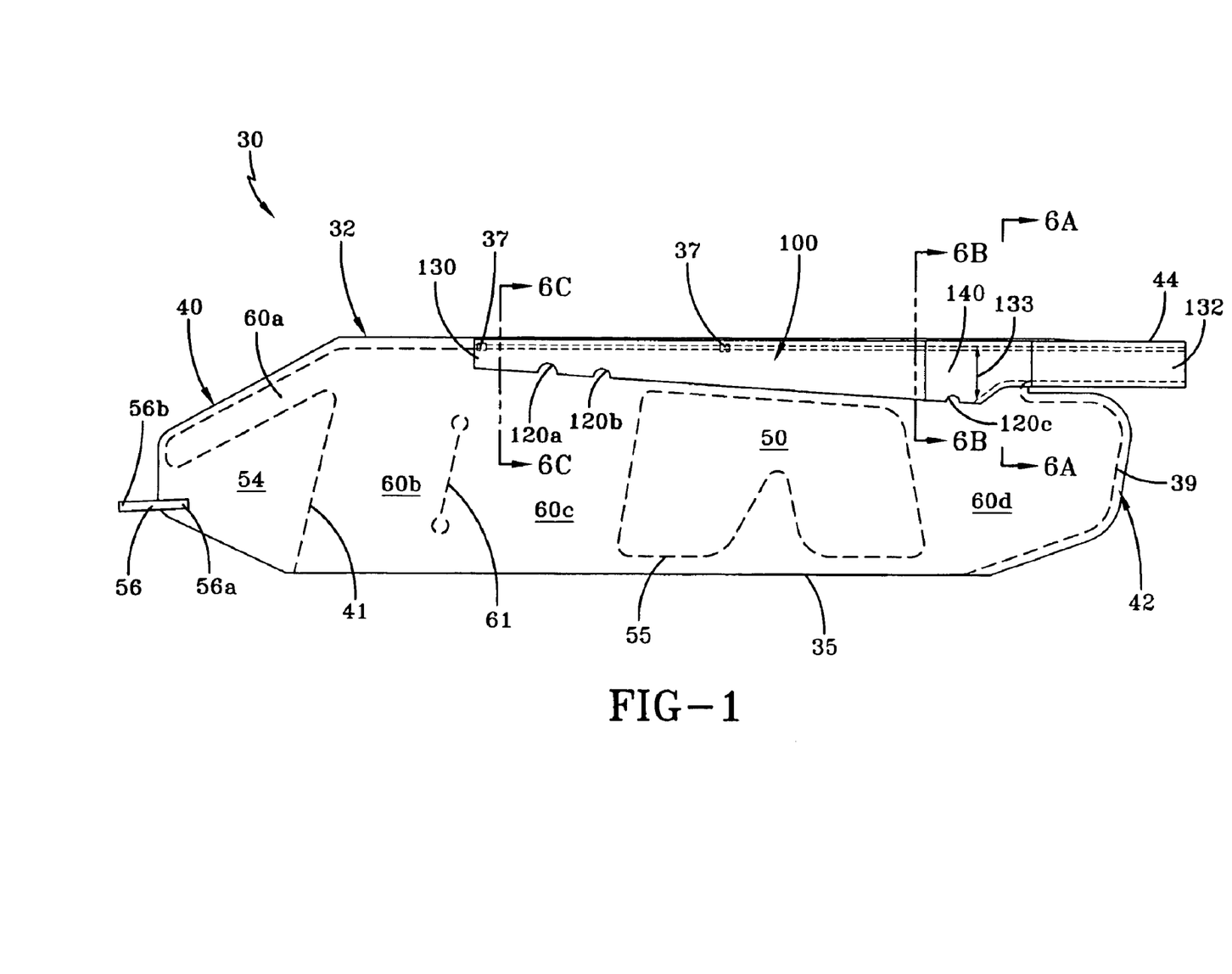
FIG. 1 is a side plan view of a completed air bag according to the present invention.
Figure 5:
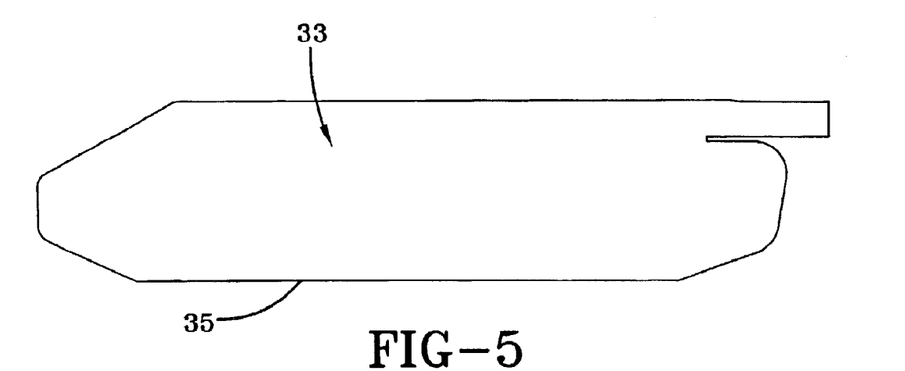
FIG. 5 shows a side plan of panel that can be used to make an air bag according to the present invention.

FIG-9 ns of the panels are then sewn together to complete the air bag (the air bag of FIG. 1 is formed in this manner). In addition, the air bag can be woven as an integral unit to form a sack with a pair of opposite panels, each of which has the general profile of the panel 33 in FIG. 5.

CURTAIN AIR BAG ASSEMBLY

RELATED APPLICATION/CLAIM OF PRIORITY

This application is related to and claims priority from provisional application Ser. No. 60/382,948, filed May 24, 2002.

FIELD OF THE INVENTION

The present invention relates to side impact air bags and more particularly to a side curtain air bag.

BACKGROUND OF THE INVENTION

A side curtain air bag is typically stored inside a vehicle headliner. At the onset of a side collision or a vehicle rollover, the curtain air bag is deployed and inflated along the side of the vehicle, to protect the vehicle occupant's head and upper torso against impact with the side of the vehicle.

A known way of constructing a side curtain air bag is to provide a pair of panels that are sewn together to form an inflatable cushion. Alternatively, rather than using a pair of panels a main panel that is folded over a centerline is used to provide the panel or panel parts that are sewn together to realize the inflatable cushion. The manner in which the panels are sewn together configures the inflatable cushion into inflatable compartments that are inflated to protect the occupant's head and upper torso during a side impact or a vehicle rollover. It is also known to inflate the inflatable compartments by a cylindrical passage located in the inflatable cushion, and which distributes inflation fluid (e.g. inflation gas) from a source along the length of the cushion and into the inflatable compartments of the cushion.

SUMMARY OF THE INVENTION

The present invention provides a new and useful configuration for a curtain air bag, and particularly to a new and useful configuration for distributing inflation fluid in a side curtain air bag. A side curtain air bag according to the present invention has an inlet configured to receive inflation gas, a plurality of inflatable chambers; and a distribution tube in fluid communication with the inlet of the air bag. The inlet and the distribution tube are configured to cause inflation gas to flow along the air bag in a predetermined direction, and the distribution tube has a conical portion configured to reduce the pressure of the inflation gas pressure that is communicated from the inlet, and to distribute the inflation gas to the inflatable compartments of the air bag. Gas flow along the air bag is in a "predetermined direction" in the sense that it flows in one direction through the inlet and distribution tube (e.g. from the rear to the front of the air bag).

The present invention also provides a new and useful way of storing a side curtain air bag in a vehicle, in a manner such that when the air bag deploys there is little risk of the air bag material getting caught in a gap between the vehicle trim and a vehicle structural member (e.g. a B or C pillar). According to this aspect of the invention, the distribution tube is wrapped about an inner (or inboard) side of the air bag when the air bag is in the stored condition, in a manner such that the distribution tube unwraps from the inboard side of the air bag and is positioned between the inboard side of the air bag and the adjacent side structure of the vehicle as inflation gas is being initially communicated to the distribution tube. This aspect of the invention is designed to enable the air bag to deploy without interference due to gaps that may exist (or may form during deployment) between the vehicle trim and adjacent structure of the vehicle.

Other features and purposes of the invention will be clear from the following detailed description and the accompanying drawings.

DETAILED DESCRIPTION OF THE INVENTION

FIG. 1 is a plan view of a first embodiment of a side curtain air bag assembly 30 configured according to the present invention. The air bag assembly 30 includes an inflatable cushion or air bag 32 that is elongated in shape, and a distribution tube 100 that distributes inflation gas through the air bag or cushion 32. As is known in the art this type of air bag is mounted to the roof rail of a vehicle, is stored within the vehicle headliner, and spans the distance between at least two pillars of the vehicle. For example, in certain types of vehicles, the air bag spans the part of the vehicle between the A and B pillars. In other types of vehicles, the air bag may span the A, B and C pillars, or it may span the A, B, C and D pillars for larger size vehicles. The front and rear (sides) 40 and 42 of the air bag are sized to extend from the appropriate-pillars of the vehicle. The air bag 32 is formed as a sack and includes an inlet 44 in the form of an integrated tubular section.

The air bag 32 can be formed in a number of ways including being woven or knitted as an integral unit or by sewing one or more panels of material together. Specifically, a pair of panels, each having the general configuration of the panel 33 in FIG. 5, can be sewn together to form the air bag. Alternatively, the air bag can be made of one larger main panel that in essence is two of the panels 33 joined along a common region such as the bottom of the bag. The bag is folded about a fold line 35 to form the pair of panels; and remaining portions of the panels are then sewn together to complete the air bag (the air bag of FIG. 1 is formed in this manner). In addition, the air bag can be woven as an integral unit to form a sack with a pair of opposite panels, each of which has the general profile of the panel 33 in FIG. 5.

Figure 6A:
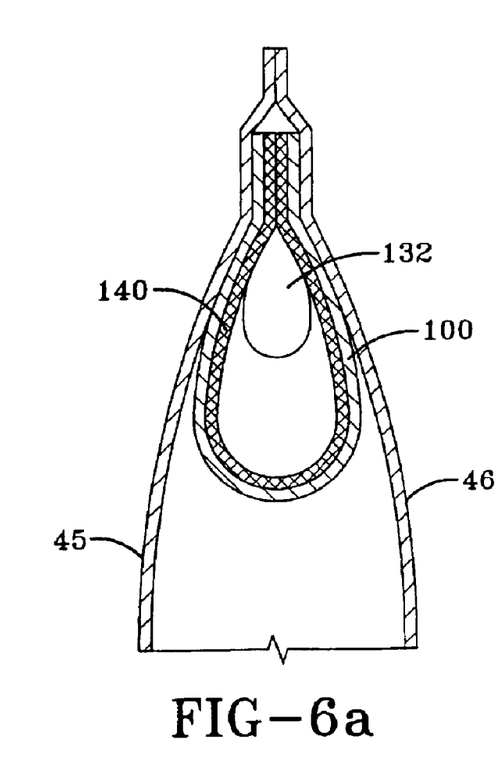
FIGS. 6a–6c show various cross-sectional views of the air bag of FIG. 1, taken from the directions 6a—6a, 6b—6b and 6c—6c, respectively.
Figure 6B:
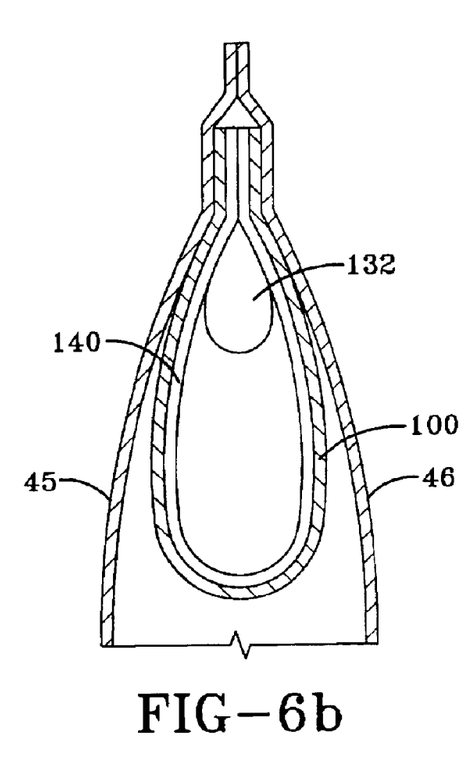
Figure 6C:
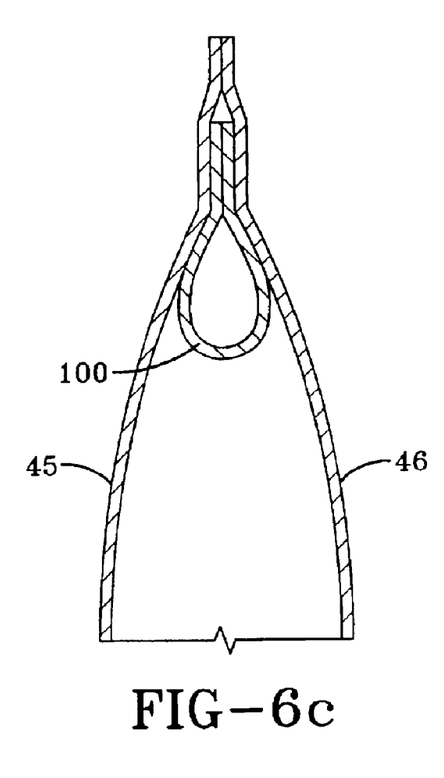

Whether formed by a pair of panels that are sewn together, or woven as an integral unit, the formed air bag will have an inner (or inboard) panel 45 and an outer (or outboard) panel 46 (see e.g. FIGS. 6a–6c). When the air bag is inflated, e.g. during a side impact or vehicle rollover, the inboard panel 45 faces the vehicle occupant and the outboard panel 46 faces the adjacent vehicle structure (e.g. the vehicle C or D pillar). Each of the inboard and outboard panels will have the general profile of the panel 33 in FIG. 5.

The interior volume of the air bag 32 is formed between the inboard and outboard panels, and is configured by linking the panels together at certain locations. As seen in FIG. 1, the inner and outer panels of the air bag are joined together at a large uninflated region generally shown as numeral 50. If the bag is formed by panels that are sewn together a peripheral seam 55 forms the uninflated region 50. If the bag is woven, the uninflated region is formed by inter-weaving the weft and warp fibers to form the peripheral seam at the border of the uninflated region (in FIG. 7 seam 355 bounds the uninflated region 350).

In the air bag of FIG. 1 a pair of panels are joined along a common region at the bottom of the air bag. Specifically, the panels are folded about the fold line 35 and then sewn together to complete the air bag. At the rear of the air bag, the panels are sewn together along a rear seam 39. At the front of the air bag, the panels are sewn together along a front seam 41, and at the top of the air bag, the panels are sewn together along a top seam (not shown). The rear seam 39 closes the rear end of the air bag. The front seam 41 closes the front side of the air bag and shapes the front of the air bag into an inflatable front compartment 60a and another uninflated region 54. The top seam closes the top of the air bag.

A tether 56, in the form or a narrow piece of material is sewn, at end 56a, to the uninflated region 54. End 56b of the tether is adapted to be mounted to an adjacent portion of the vehicle. In addition, the rear of the air bag may include a second tether (not shown) as an option.

As illustrated in FIG. 1, the interior volume of the air bag 32 is segmented into smaller inflatable compartments 60a–60d. Inflatable front compartment 60a is shaped as a tube by the front seam 41 and sized and positioned to be located adjacent the A-pillar of the vehicle when the air bag is inflated. Compartments 60b, 60c are separated by a tether 61, which is sewn into the air bag. For example, a tether 61 can be formed either by (i) sewing portions of the panels directly to each other (sometimes referred to as a 2D tether) or (ii) sewing a segment of fabric material to each of the panels (sometimes referred to as a 3D tether). When the air bag is woven, appropriate interweaving of the weft and warp fibers that form the air bag form the tether(s). Alternatively, in a woven air bag, the woven bag can have a bottom opening, that allows a 3D tether to be sewn to the inside of the bag, before the bottom opening is sewn closed.

Figure 2:
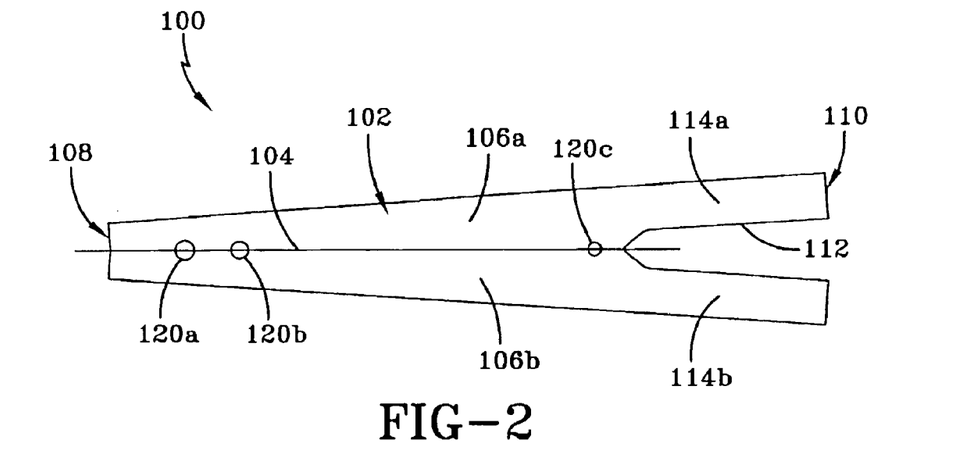
FIG. 2 shows a panel of material used to form a distribution tube for an air bag according to the present invention.
Figure 2A:
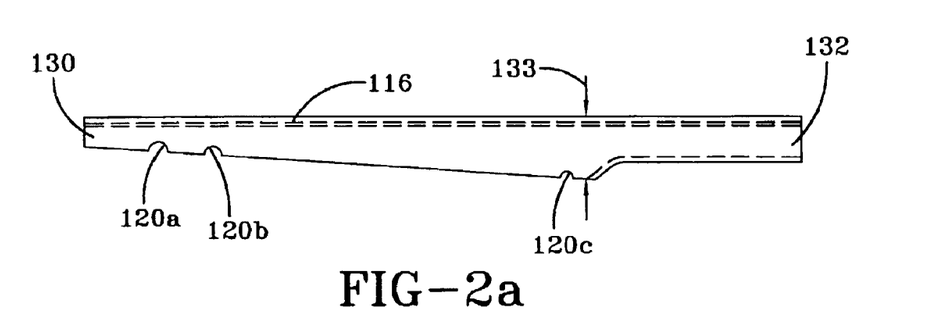
FIG. 2a shows a formed distribution tube for an air bag according to the present invention.

The distribution tube 100 can be formed using a panel 102 of air bag material (e.g. woven nylon coated with silicon or urethane), or integrally woven into the air bag. FIG. 2 shows the panel 102 and FIG. 2a shows the distribution tube 100 formed from the panel 102. In FIG. 2, the panel 102 is shown in a flattened configuration. The panel 102 is symmetric about a centerline 104 and is shaped so that a significant portion of the distribution tube is generally conically shaped. The panel 102 includes sides 106a and 106b that taper relative to one another. A front (or front end) 108 is truncated while a rear (rear end) 110 includes a slot 112 that forms opposing legs 114a and 114b. The distribution tube 100 is formed by folding over panel 102 about the centerline 104, aligning sides 106a and 106b and stitching the aligned sides together along sew seam 116 (see FIG. 2a). The opposing legs 114a and 114b form a generally cylindrical inlet 132 that is in one piece with the distribution tube, and the remainder of the distribution tube has a conical configuration that has a relatively wide portion adjacent the inlet 132 and tapers as it extends away from the inlet. As illustrated in FIG. 1, when the distribution tube 100 is incorporated into the air bag, the distribution tube 100 (including the inlet 132) extends generally along the top of the air bag. Also, it should be noted that the inlet and the distribution tube will cause inflation gas to flow along the air bag in a predetermined direction. By "predetermined direction" applicants mean that gas flow from the inlet and along the distribution tube is in one direction along the air bag (e.g. in the example of FIG. 1 from the rear to the front of the air bag).

The panel 102 (FIG. 2) that forms the distribution tube may include a plurality of openings 120a, b, c positioned along the centerline 104, or the openings can be formed in the panel subsequent to sewing the panel together. The positioning and diameter of each opening will depend on the size and location of the inflatable compartments 60a–60d of the air bag and the location of the inflator used to provide inflation gas to the air bag.

As can be seen in FIG. 1 or 2a the conical portion of the distribution tube 100 has a relatively wide portion 133 adjacent the inlet 132, and tapers from the relatively wide portion for most of its remaining length. A relatively narrow end 130 of the distribution tube 100, which is formed at the front end 108 of the panel 102, is typically left open to communicate inflation gas to the front inflatable portion 60a. The inlet tube 132 is disposed in and effectively forms part of the air bag inlet 44 that couples the air bag to an inflator, as described further below.

Figure 3:
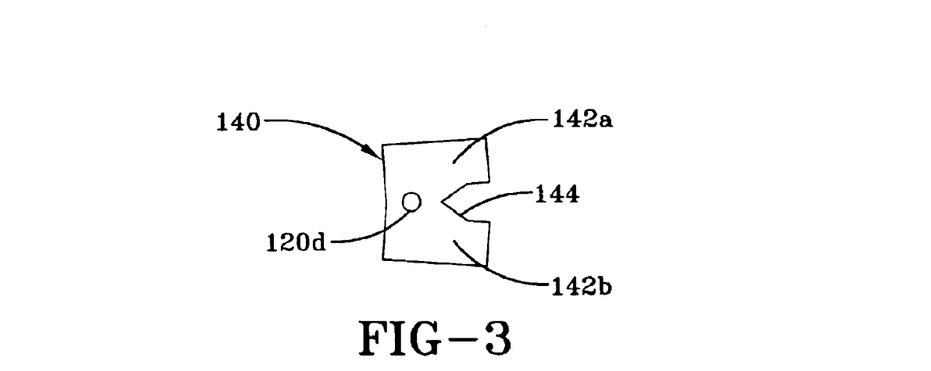
FIG. 3 shows a section of material used to form a heat shield for an air bag according to the present invention.

Reference is briefly made to FIG. 3 that shows the panel 140 that is used to form a heat shield. Panel 140 includes sides 142a and 142b and an opening 120d. One end or side of the panel 140 includes a slot 144. As will be appreciated, the inflation gas used may be heated to a high temperature such as that found in hybrid or pyrotechnic inflators. The hottest gases will be received at the inlet portions of the distribution tube 100. The heat shield is used, if needed, to provide added protection to the distribution tube 100. The heat shield is typically a woven nylon material coated with urethane or silicon or other coating. Prior to sewing the distribution tube 100 closed, the heat shield 140 is positioned on the panel 102 with opening 120d aligned to opening 120c and with the sides 142a and 142b respectively aligned to the sides 106a and 106b of the panel 102. Both panels 102 and 140 are folded over the centerline 104 and sewn together along seam 116. The resulting distribution tube 100 is shown in FIGS. 1 and 2a. As illustrated in FIG. 1, the heat shield 140 does not extend all of the way down the inlet tube 132. However, the size of the heat shield 140 can be extended to provide such coverage and protection along the entire length of the inlet tube 132.

When the distribution tube 100 is inflated by gas, the inlet portion 132 of the distribution tube 100 will expand to a generally cylindrical shape, and transitions into the conically shaped portion of the tube. Gas flows through the inlet 132 and the conical portion of the distribution tube in one direction, which in the disclosed embodiment is along the top of the air bag from the rear end to the front end of the air bag. The distribution tube 100 will expand to its conical shape. The relatively wide portion 133 acts as a gas expansion volume that reduces the gas pressure of the inflation gas entering the conical portion. The diameter of the distribution tube 100 downstream of the relatively wide portion gets progressively smaller to accelerate the movement of inflation gas toward the front end of the tube 100 and into the forward inflatable portions 60a, 60b, 60c of the air bag 32. As the inflation gas flows along the conical portion of the distribution tube, the inflation gas accelerates and is directed into the inflatable compartments through the openings 120a–c, and 130 in the distribution tube. Opening 120c which in the example of FIG. 1 is located at the rear of the air bag is closer to the inflator than the other openings 120a and 120b and is the smallest of the openings in the distribution tube 100. The small sized opening 120c prevents early entry of too much inflation gas into the rear inflatable compartment 60d. Opening 120b is larger than opening 120c but smaller than opening 120a to facilitate uniform filling of other compartments of the air bag 32. Inflation gas also enters the air bag 32 through the open end 130 of the distribution tube 100. In the example of FIG. 1, the slope of the conical portion of the distribution tube 100 is about 5 degrees.

Figure 4:
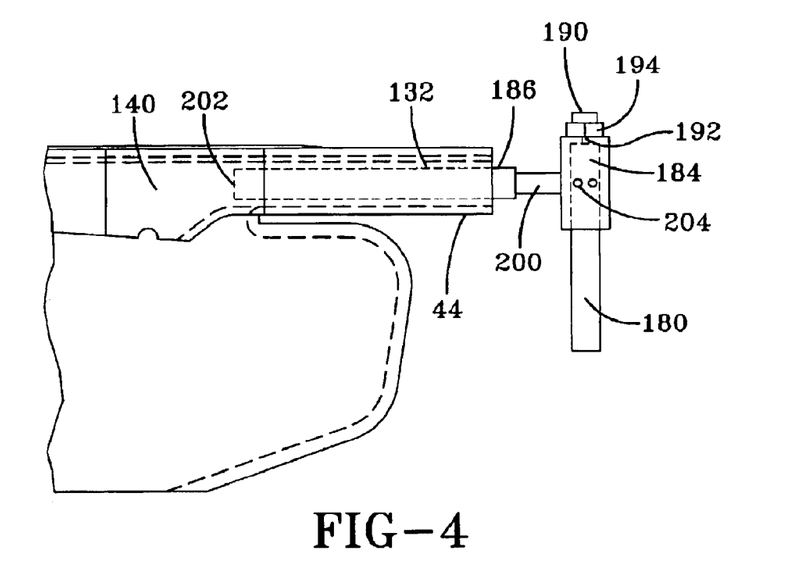
FIG. 4 shows an inflator connected to an air bag according to the present invention.

Reference is briefly made to FIG. 4, which shows an inflator 180 connected to the inlet tube 132 and the inlet 44 of the air bag through a housing 184 and a fill tube hose 186. The inlet tube 132 is disposed in the inlet 44 of the air bag. The fill hose or tube 186 can be a thin walled, rigid or semi-rigid metal or plastic that is disposed in the inlet tube 132. Alternatively the hose can resemble a fire hose with a woven or braided exterior surrounding a rubberized flexible hollow core. Thus, the inlet tube 132 and the fill hose 186 effectively form part of the air bag inlet 44.

The inflator 180 is cylindrical in shape and received within a bore or passage of the housing 184. A mounting bolt 190 that is part of the inflator extends through an opening 192 in the housing. A nut 194 secures the inflator to the housing. The housing and/or the inflator may include mounting fasteners for attachment to the vehicle proximate the C or D pillar or to the roof rail. The inflator housing 184 includes an exit tube 200. The fill hose 186 is connected at one end to the end of the housing exit tube 200. The fill hose extends through the inlet 132 of the distributor tube. An exit end 202 of the fill hose is located proximate heat shield 140. The inflator includes a plurality of exit ports 204 which are located near the housing exit tube 200. Appropriate seals can used to prevent inflation gas from leaking out between the housing and the inflator.

In the construction of the air bag assembly of FIG. 1, the distribution tube 100 is formed as a separate component, and inserted into the air bag 32 through the inlet 44 of the air bag. The distribution tube 100 is extended to its full length such as by a push tube, and pushed up so that seam 116 is disposed against the top of the air bag. The distribution tube is held in this position by tacking (sewing) the distribution tube 100 to the air bag at one of more locations shown by numeral 37 (FIG. 1). Alternatively, the distribution tube can have tabs that extend upward from the distribution tube and which are sewn to the air bag panels when those panels are sewn together along the top perimeter seam. The inlet tube 132 as well as the fill hose 186 can be clamped between the air bag inlet 44 and the exit tube 200 of the housing using a hose clamp (not shown). Thus, the inlet tube 132 and the fill hose 186 effectively become part of the air bag inlet.

FIGS. 6a–c show cross-sectional views of the air bag 32. Those figures also show the manner in which the inlet tube 132, the remainder of the distribution tube 100, heat shield 140, and the inboard and outboard panels 45, 46 are oriented in a completed air bag. As seen from FIGS. 6a and 6b, the flow area of the inlet tube 132 is smaller than the relatively wide conical portion of the distribution tube 100.

Figure 7:
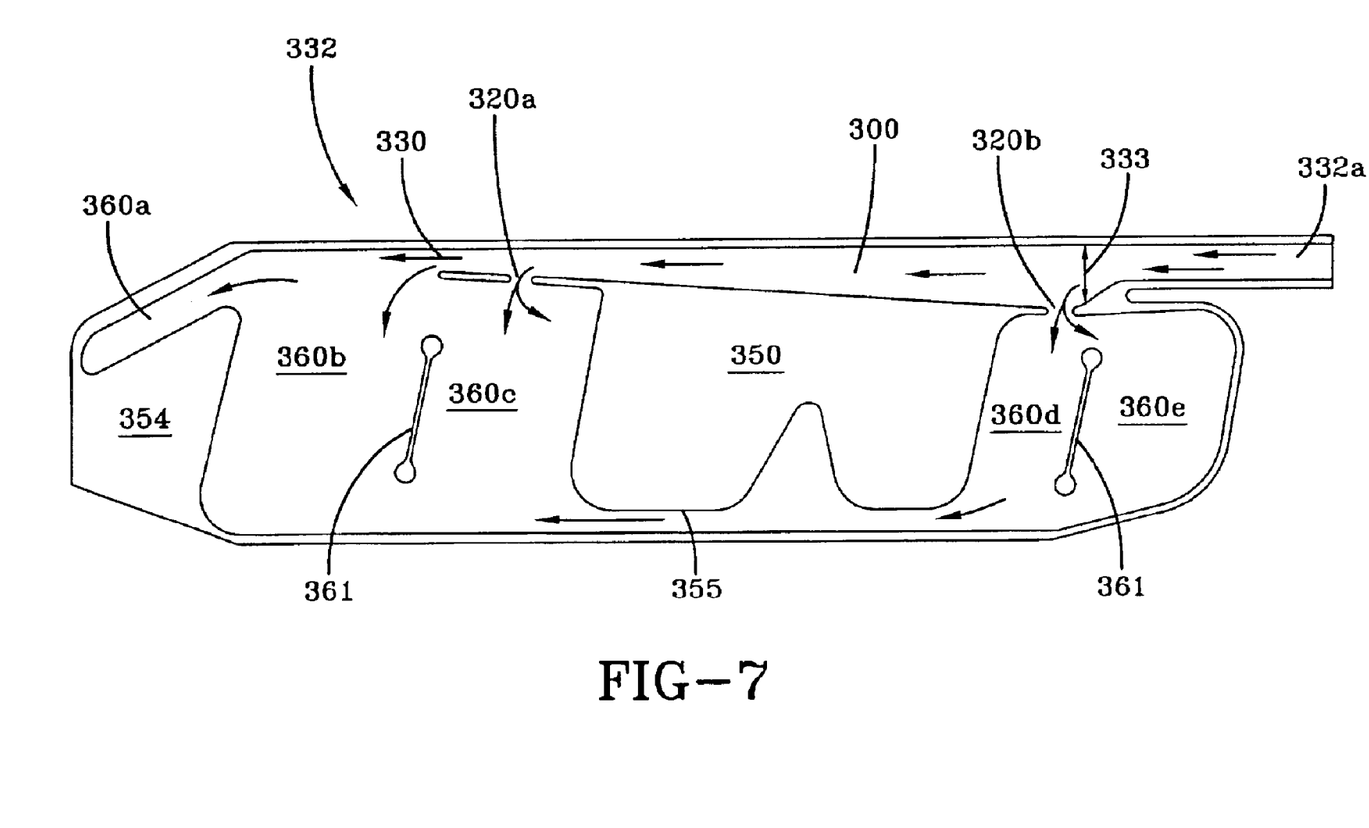
FIG. 7 shows a one-piece-woven air bag that incorporates features of the invention.

Reference is made to FIG. 7 which shows another configuration for an air bag according to the invention. The air bag 332 shown in FIG. 7 is made on a Jacquard loom and in often referred to, by the industry, as a one-piece woven air bag. It is common, in general, how to make such an air bag. The finished air bag can be configured to have one or more inflatable compartments such as 360a–360e as well as a plurality of interconnecting passageways. The weaving process provides uninflatable regions in the bag that are analogous to the uninflatable regions in the sewn-together-bag. Such uninflatable regions may include a center portion 350, a front portion 354 and thin regions 361, which comprise internal tethers. The woven air bag 332 also includes a conically shaped, integrally formed distribution tube 300, which extends along the top of the air bag. The distribution tube is configured with an inlet tube 332a and with outlet openings 320a and 320b. The front end of the distribution tube 300 is can be configured with an outlet 330 that allows gas flow toward the front of the air bag, as in the earlier embodiment, or the front end of the distribution tube can be closed. The distribution tube transitions from the inlet 332a to a conical portion with a larger expansion region 333 adjacent the inlet 332a. The conical portion gradually narrows to accelerate the gas flow in the conical portion, and the conical portion has the outlet openings 320a, 320b, and the front outlet 330 that are configured to distribute the inflation gas to the inflatable compartments 360a–360e of the air bag according to the same principles as with the earlier embodiment.

After the air bag 32 (or 332) is formed, it is folded, placed in a protective sack (which itself can be opened as the air bag begins to inflate) and installed (stored) in a headliner at or near the roof rail of the vehicle. Depending on the desires of the vehicle manufacturer the inflator can be secured to the air bag prior to assembly in the vehicle. The air bag 32 (or 332) and the inflator 180 and the housing 184 comprise an air bag module.

Figure 8:
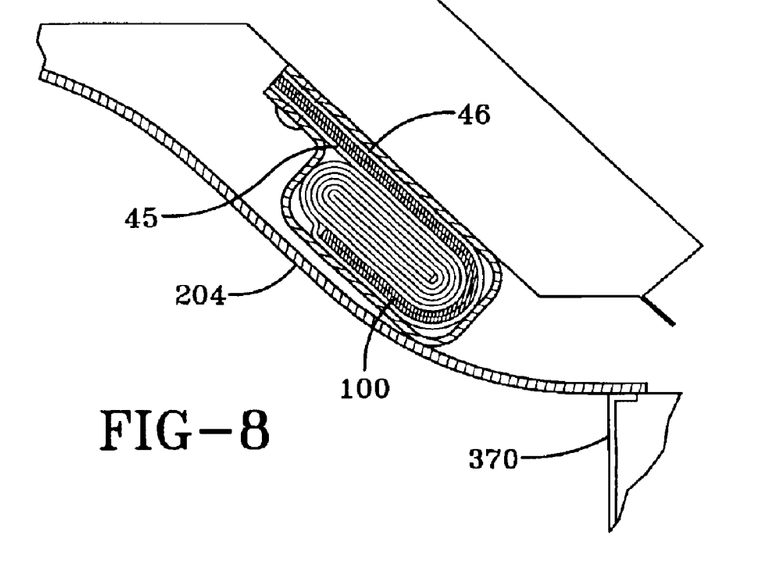
FIG. 8 schematically illustrates the manner in which an air bag is stored in a vehicle, according to the principles of the present invention.
Figure 9:
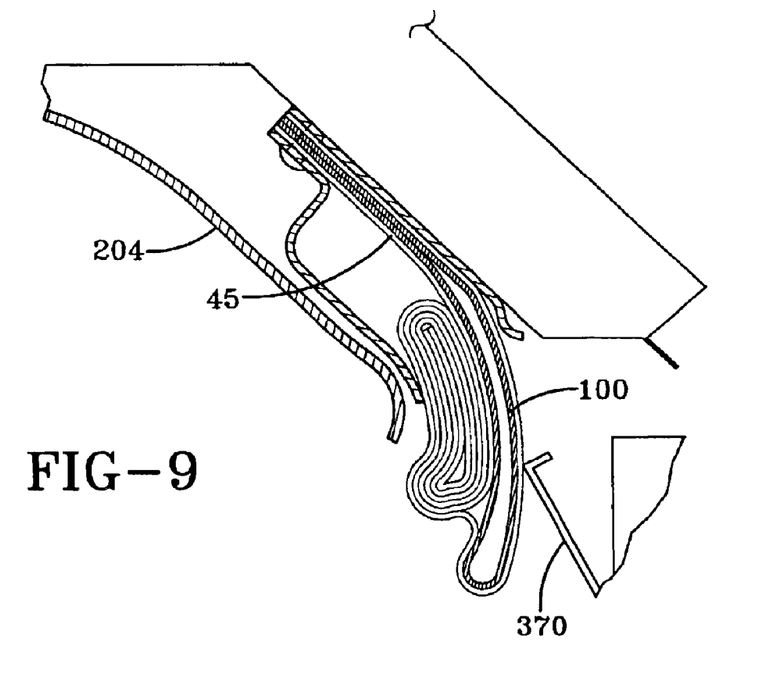
FIG. 9 schematically illustrates the manner in which the air bag deploys during a side impact or vehicle rollover, according to the principles of the present invention.

FIGS. 8 and 9 show the manner in which the air bag is stored and how the distribution tube functions as the curtain air bag is being deployed during a vehicle side impact or a vehicle rollover. As should be clear from the previous discussion, in the event of a vehicle side impact or rollover, the distribution tube 100 initially receives inflation gas, which it distributes to the inflatable portions of the air bag. When the air bag is inflated, the inner (or inboard) panel 45 of the air bag is oriented to face a vehicle occupant and the outer (or outboard) panel 46 of the air bag is oriented to face adjacent side structure of a vehicle (e.g. the vehicle B, C, pillars, etc.). That side structure may include trim that has (or can form) gaps with the remainder of the side structure during a vehicle side impact or rollover. The air bag is stored inside the vehicle headliner 204, with the distribution tube 100 wrapped about the inner side panel 45 of the air bag when the air bag is in the stored condition (see FIG. 8). As schematically illustrated in FIG. 9, when the air bag is being deployed (e.g. during a side impact or vehicle rollover), inflation gas is initially directed to the distribution tube 100. The distribution tube initially unwraps from the inboard panel of the air bag 32 and is positioned between the inboard panel 45 of the air bag and the trim 370 at the adjacent side structure of the vehicle as inflation gas is being initially communicated to the distribution tube. Thus, the distribution tube is positioned effectively to cover those gaps and to enable the air bag to deploy without interference with gaps that may exist or may form between the vehicle trim and adjacent structure of the vehicle.

Accordingly, the foregoing disclosure provides a vehicle side curtain air bag designed to efficiently distribute inflation fluid during deployment, and a storage pattern for the air bag that enables the curtain air bag to deploy without interference with gaps that may exist (or may form) between the vehicle trim and adjacent structure of the vehicle. Many changes and modifications in the above-described embodiment of the invention can, of course, be carried out without departing from the scope thereof. Accordingly, that scope is intended to be limited only by the scope of the appended claims.

We claim:

1. A curtain air bag assembly comprising:
an inflatable air bag in a stored condition having a fluid inlet configured to communicate with a source of inflation gas and a plurality of inflatable compartments, the fluid inlet configured to direct inflation gas into the air bag in a predetermined direction, the air bag having an inboard side that faces a vehicle occupant and an outboard side that faces adjacent side structure of a vehicle when the air bag is inflated; and
a distribution tube disposed in the air bag, the distribution tube having a conical portion in fluid communication with the fluid inlet, the conical portion configured to reduce the pressure of inflation gas communicated from the fluid inlet and direct the distribution of inflation gas along the air bag in the predetermined direction, the distribution tube further configured to distribute inflation gas to the inflatable compartments of the air bag, the distribution tube being wrapped about the inboard side of the air bag when the air bag is in the stored condition, and in a manner such that the distribution tube unwraps from the inboard side of the air bag and is positioned between the inboard side of the air bag and the adjacent side structure of the vehicle as inflation gas is being initially communicated to the distribution tube.

2. The curtain air bag assembly of claim 1 wherein the fluid inlet comprises an inlet tube integrally connected with the distribution tube.

3. The curtain air bag assembly of claim 1 wherein the fluid inlet comprises an inlet tube formed in one piece with the distribution tube.

4. The curtain air bag assembly of claim 1 wherein the conical portion of the distribution tube has a relatively wide section adjacent to and in fluid communication with the inlet tube, the flow-area of the inlet tube being smaller than the flow area of the relatively wide section of the conical portion of the distribution tube.

5. The curtain air bag assembly of claim 1, wherein the distribution tube comprises a separate component that is coupled to the inflatable air bag.

6. An air bag assembly comprising:
an inflatable air bag having an inlet configured to receive inflation gas,
a distribution tube disposed in the air bag and in fluid communication with the inlet and with the inflatable air bag,
the air bag having an inboard side that faces a vehicle occupant and an outboard side that faces adjacent side structure of a vehicle when the air bag is inflated,
the air bag being in a stored condition and being inflatable by inflation gas communicated to the air bag through the distribution tube, and
the distribution tube being wrapped about the inboard side of the air bag when the air bag is in the stored condition, and in a manner such that the distribution tube unwraps from the inboard side of the air bag and is positioned between the inboard side of the air bag and the adjacent side structure of the vehicle as inflation gas is being initially communicated to the distribution tube.

* * * * *